(12) United States Patent
Liu et al.

(10) Patent No.: US 8,708,527 B2
(45) Date of Patent: Apr. 29, 2014

(54) LIGHT MODULE AND OPTICAL LENS FOR THE LIGHT MODULE

(75) Inventors: Hua-tang Liu, Taichung City (TW); Ching-Shiang Wang, Taichung City (TW)

(73) Assignee: Asia Optical Co., Inc., Taichung (TW)

(*) Notice: Subject to any disclaimer, the term of this patent is extended or adjusted under 35 U.S.C. 154(b) by 33 days.

(21) Appl. No.: 13/109,796

(22) Filed: May 17, 2011

(65) Prior Publication Data
US 2012/0294013 A1    Nov. 22, 2012

(51) Int. Cl.
*F21V 5/04* (2006.01)
(52) U.S. Cl.
USPC .............. 362/268; 362/311.06; 362/311.12; 362/332

(58) Field of Classification Search
USPC ............ 362/311.04, 311.12, 311.1, 268, 331, 362/259, 332, 333, 334, 335, 336, 338, 362/311.06; 250/221
See application file for complete search history.

(56) References Cited

U.S. PATENT DOCUMENTS

| | | | | |
|---|---|---|---|---|
| 4,644,455 A | * | 2/1987 | Inglis et al. | 362/509 |
| 4,652,979 A | * | 3/1987 | Arima | 362/522 |
| 6,193,400 B1 | * | 2/2001 | Schuster et al. | 362/538 |
| 7,648,256 B2 | * | 1/2010 | Shiratsuchi et al. | 362/268 |

* cited by examiner

*Primary Examiner* — Thomas Sember
(74) *Attorney, Agent, or Firm* — Tracy M. Heims; Apex Juris, PLLC

(57) ABSTRACT

A light module includes a light source and an optical lens. The light source emits light to the optical lens. The light source is a single unit and has a parallelizing surface, a first plane, a wave surface, and a second plane in sequence. The light source emits light to the optical lens and through the parallelizing surface, the first plane, the wave surface, and the second plane in sequence to form a parallel linear light.

9 Claims, 7 Drawing Sheets

LIGHT MODULE AND OPTICAL LENS FOR THE LIGHT MODULE

BACKGROUND OF THE INVENTION

1. Field of the Invention

The present invention relates generally to an optical device, and more particularly to a light module capable of changing the light into linear and parallel light and an optical lens for the light module.

2. Description of the Related Art

In present days, the touch panels and the touch systems, which provide user to operate image directly, are more and more popular in the market. Typically, there are two types of touch panels in the present market, resistive touch panels and capacitive touch panels. For a resistive touch panel, a pressure of finger touching the screen may cause a change of resistance to identify the location of the finger on the screen. However, the screen must be made of a flexible material that the surface of the screen will be worn and scratched for a time of use, and the speed of sense will slow down when one keeps pressing the same place. For a capacitive touch panel, it senses the natural current in human body when one touches the screen to identify the location of finger on the screen. However, the capacitive touch panel will not work when one wears glove or touches the screen by fingernail.

Recently, a new touch panel, photo-sensor type touch panel, is provided in the market. As shown in FIG. 1, a photo-sensor type touch panel is provided with two reflectors 110 to reflect laser rays of laser modules 120 crossing a screen 130 to be received by receivers 140. When one touches the screen 130 to block some laser rays, the specific receivers 140 will not receive the laser rays to identify the location of the finger. FIG. 2 shows another photo-sensor type touch panel, which has two micro-electromechanical systems (MEMS) to swing reflectors 210 to reflect linear laser rays of laser module 220 crossing a screen 230 to be received by receivers 240. For the same principle, when one touches the screen 240 to block some laser rays, the specific receivers 240 will not receive the laser rays to identify the location of the finger.

However, the photo-sensor type touch panel still has the following drawbacks:

1. It needs a space for the reflectors 210 and the MEMS that the photo-sensor type touch panel usually has a big size.

2. The MEMS is very expense, and it needs time to bootup that it slows down the time of sense of the photo-sensor type touch panel.

3. The use of reflectors needs the laser of great power that photo-sensor type touch panel needs more power.

In order to overcome the above drawbacks, an improved light module for the photo-sensor type touch panel, which provides a linear light without reflector, is provided. As shown in FIG. 3, Taiwan patent no. I323769 taught such light module including an optical lens 300 and a lamp 330. The optical lens 300 includes a light collector 310 and a lenticular lens array 320 with a waved surface. I323769 taught that such light module may be incorporated in street lamp or other types of lamp. However, the lamp 330 emits light to the light collector 310 and the lenticular lens array 320 in sequence to project a parallel and linear light, as shown in FIG. 4, which just meets the requirement of the photo-sensor type touch panel. However, the light module of I323769 still has some drawbacks. The light from the lamp 310 will be transformed into parallel light by the light collector 310, and all of the parallel light will be reflected by the lenticular lens array 320 at a time. Therefore, the light couldn't get a better diffusion. In addition, the lenticular lens array 320 can't provide the light with a better diffusion as well because the crests and the troughs of the waved surface will concentrate the light.

In conclusion, the conventional light modules and the optical lens still have some places to be improved.

SUMMARY OF THE INVENTION

The primary objective of the present invention is to provide a light module to project a parallel linear light without reflector.

According to the primary objective of the present invention, a light module includes a light source and an optical lens. The light source emits light to the optical lens. The light source is a single unit and has a parallelizing surface, a first plane, a wave surface, and a second plane in sequence.

The light from the light source enters the optical lens via the parallelizing surface and leaves the optical lens via the first plane, and then the light enters optical lens again via the wave surface and leaves the optical lens via the second plane.

DETAILED DESCRIPTION OF THE INVENTION

Figure 1:
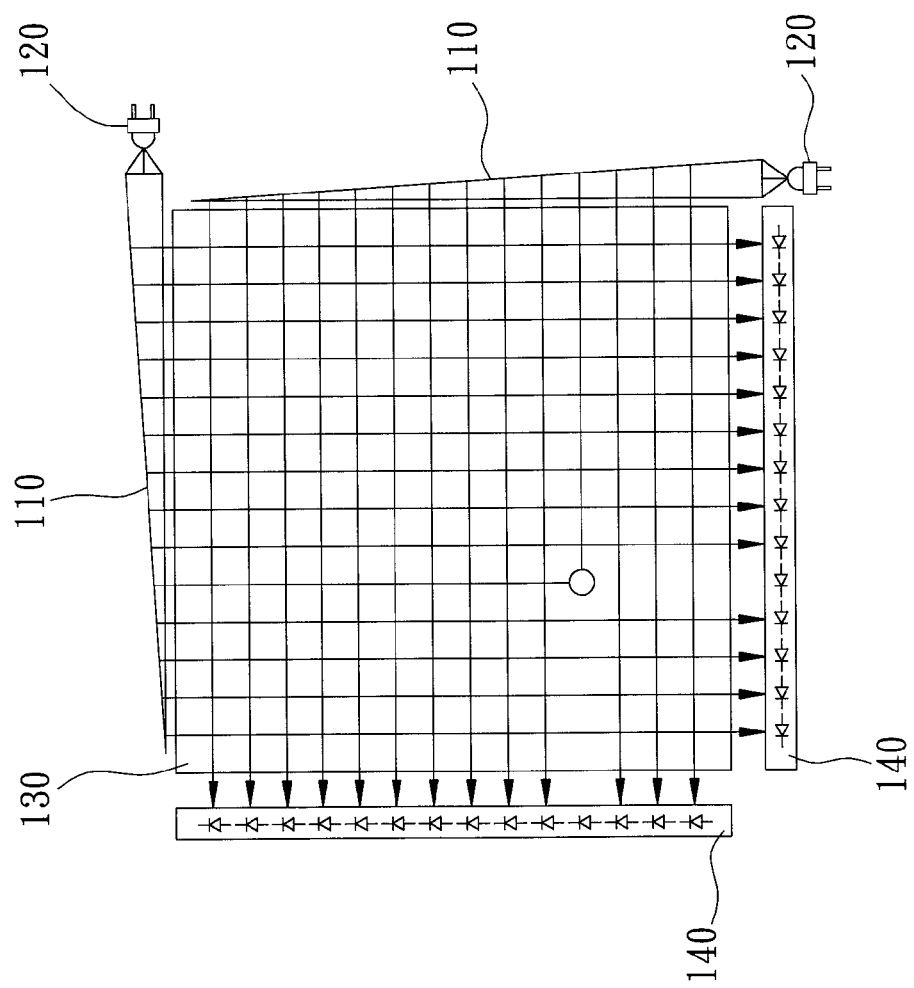
FIG. 1 is a sketch diagram of the conventional photo-sensor type touch panel.
Figure 2:
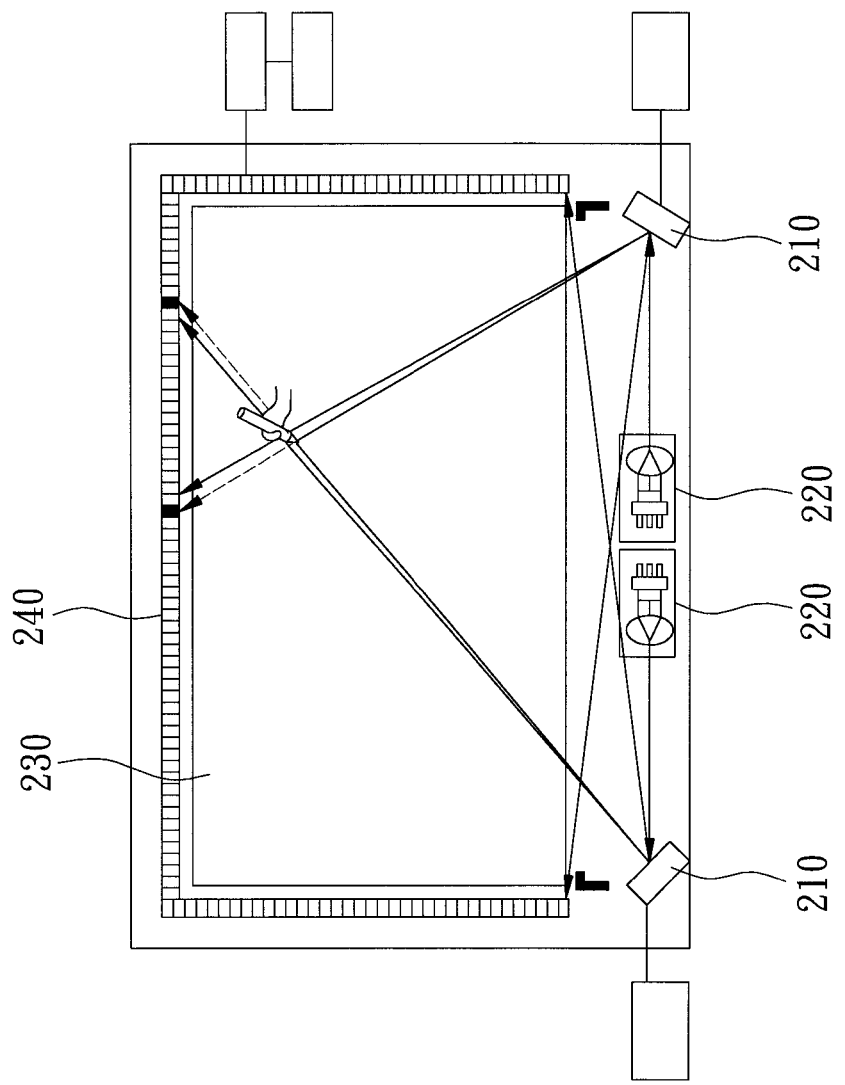
FIG. 2 is a sketch diagram of another conventional photo-sensor type touch panel.
Figure 3:
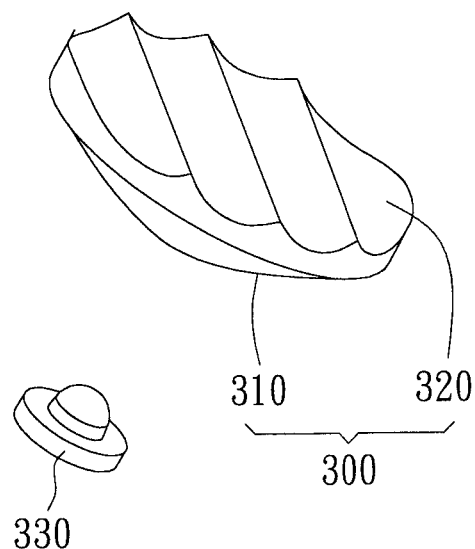
FIG. 3 is a perspective view of the conventional light module to project linear light.
Figure 4:
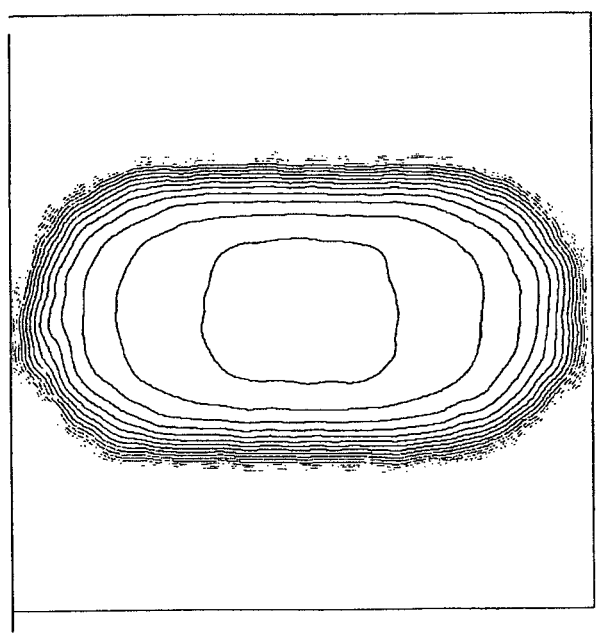
FIG. 4 is an illumination map of the conventional light module shown in FIG. 3.
Figure 5:
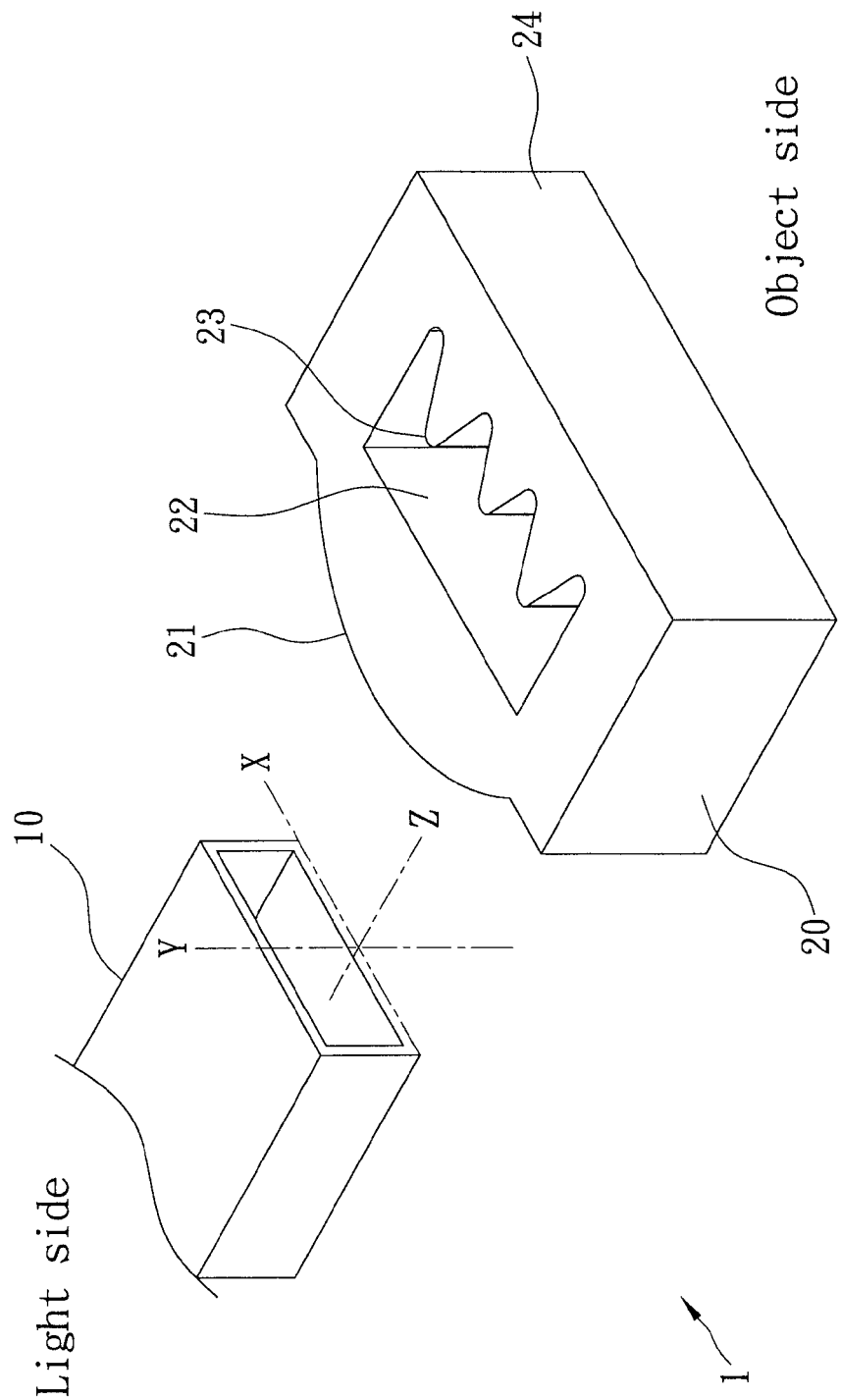
FIG. 5 is a perspective view of a preferred embodiment of the present invention.

As shown in FIG. 5, a light module 1 of the preferred embodiment of the present invention is incorporated in a photo-sensor type touch panel. The light module 1 includes, from a light side to an object side, a light source 10 and an optical lens 20.

The light source 10 is a laser emitting device in the present invention to emit laser rays to the object side. The light source 10 may be LED, lamp, bulb, or other light emitting devices.

The optical lens 20 is a plastic lens made by injection molding. The optical lens 20, from the light side to the object side, has a parallelizing surface 21, a first plane 22, a wave surface 23, and a second plane 24. The parallelizing surface 21 is a convex plane. The wave surface 23 has flat portions at crests and troughs. The parallelizing surface 21 is formed at an end of the optical lens 20, and the second plane 24 is formed at an opposite end. The optical lens 20 has a cavity at a center thereof to form the first plane 22 and the wave surface 23 at opposite sidewalls of the cavity. Therefore, the laser from the light source 10 enters the optical lens 20 via the parallelizing surface 21 and leaves the optical lens 20 via the first plane 22 (enters the cavity), and then the laser will enter optical lens 20 again via the wave surface 23 and leave the optical lens 20 via the second plane 24.

Figure 6:
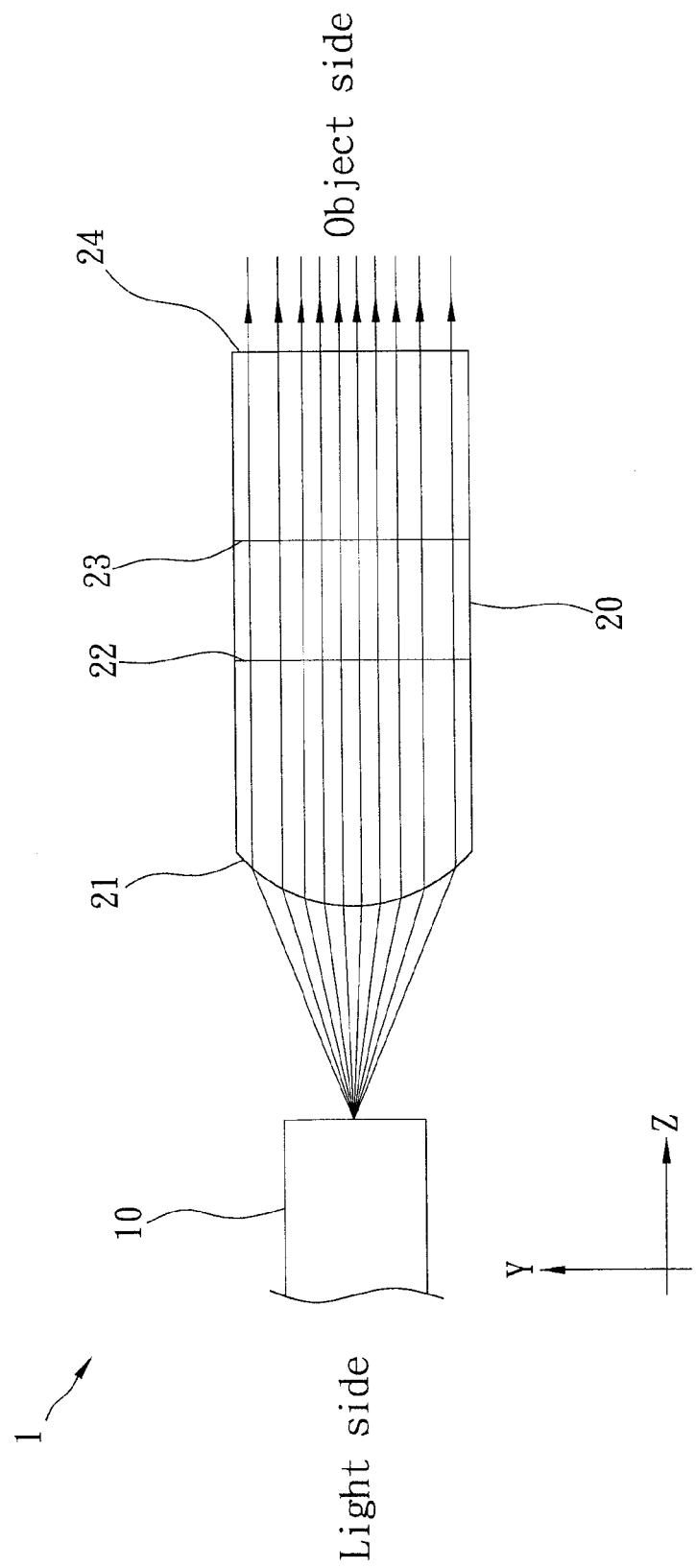
FIG. 6 is a sectional view in Y-Z plane and the light path of the preferred embodiment of the present invention.
Figure 7:
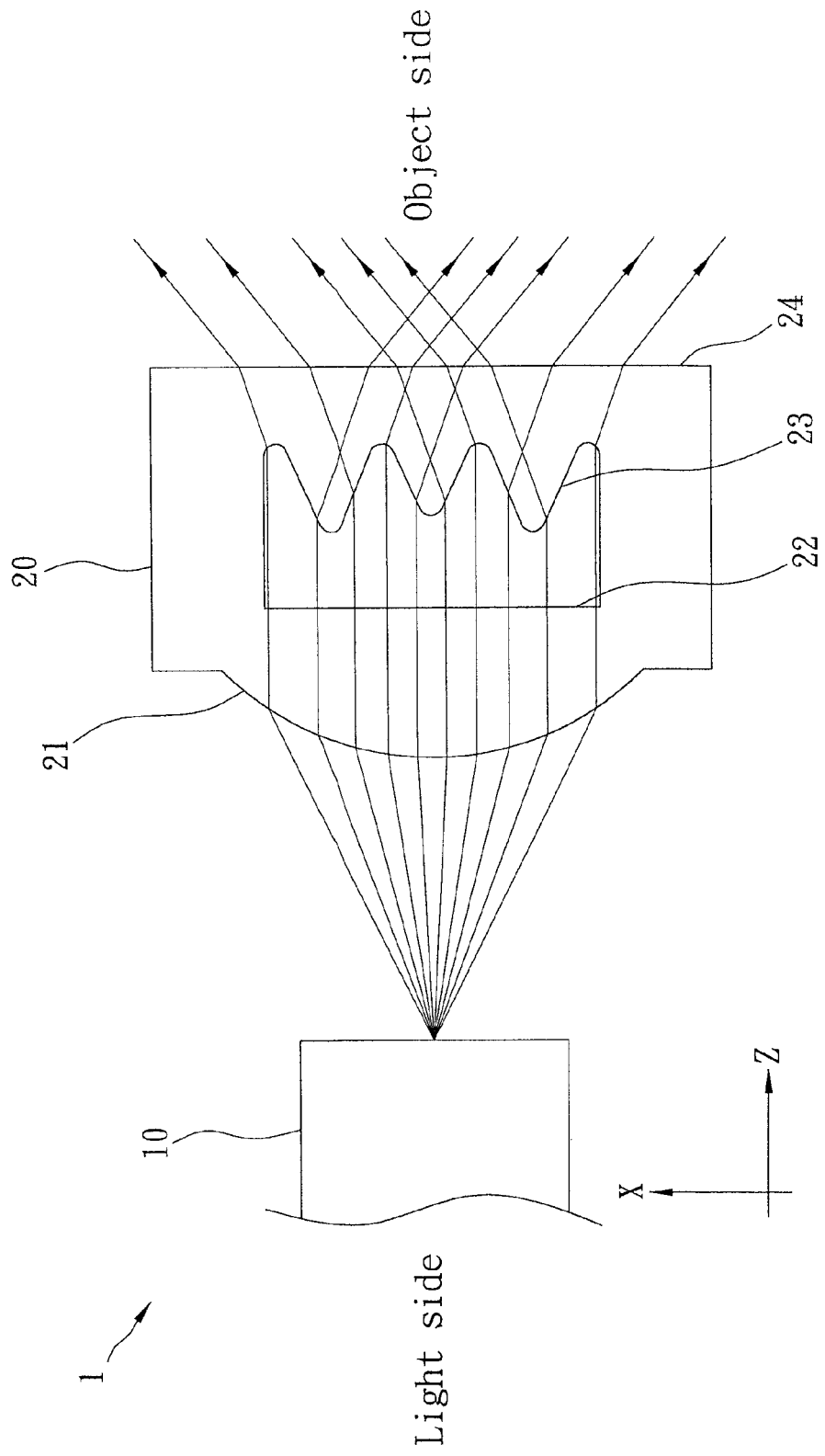
FIG. 7 is a sectional view in X-Z plane and the light path of the preferred embodiment of the present invention.
Figure 8:
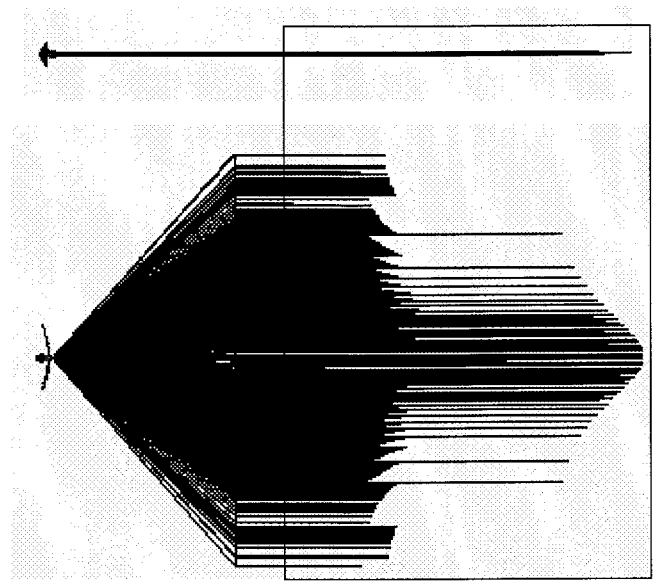
FIG. 8 is an illumination map in three dimensions of the preferred embodiment of the present invention.
Figure 9:
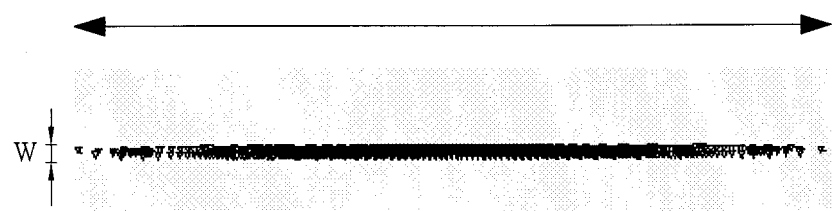
FIG. 9 is a sketch diagram of the shape of the light projected on the object from the preferred embodiment of the present invention.

As shown in FIG. 6 and FIG. 7, when the light source 10 emits laser, the laser will become parallel light when it projects through the parallelizing surface 21 and the first plane 22 and become linear light when it projects through the wave surface 23 and the second plane 24. Besides, the laser will be reflected twice or more when it projects through the parallelizing surface 21, the first plane 22, the wave surface 23, and the second plane 24 that the laser may be diffused to form a diffused, parallel and linear light. Therefore, as shown in FIG. 8, a diffusing angle of the light through the optical lens 20 of the present invention may reach 120 degrees that when the light arrives an object, which is 50 mm away from the light source 10, it is a transverse linear light with a width W between 0.1 mm and 0.5 mm.

In conclusion, the light module 1 of the present invention has a simple structure and a small size to provide a linear light with narrow width and great diffusing angle.

The advantages of the light module 1 of the present invention include:

1. There is no MEMS and reflector in the light module that may speed up the time of bootup and reaction.

2. The light module 1 of the present invention has a small size and may project thin parallel linear light that the photo-sensor touch panel incorporated with the light module 1 of the present invention may be made thinner and smaller.

3. The light source 10 only needs to provide the laser with regular power because there is no reflector involved that the photo-sensor touch panel incorporated with the light module 1 of the present invention may save more power.

It is noted that the light module 1 of the present invention may be incorporated in any field, except for photo-sensor touch panel, which needs parallel linear light. Therefore, any device which equipped with the light module 1 of the present invention, which projects light through the parallelizing surface 21, the first plane 22, the wave surface 23, and the second plane 24 in sequence still should be within the scope of the present invention.

The description above is a few preferred embodiments of the present invention. These equivalences of the present invention are still in the scope of claim construction of the present invention.

What is claimed is:

1. A light module, comprising:
   a light source for emitting light from a light side to an object side; and
   an optical lens, which is a single unit, having a parallelizing surface, a first plane, a wave surface, and a second plane from the light side to said object side and where the optical lens has a cavity at a center to form the first plane and the wave surface at opposite sidewalls of the cavity and;
   wherein the light from the light source enters the optical lens via the parallelizing surface and leaves the optical lens via the first plane, and then the light enters said optical lens again via the wave surface and leaves the optical lens via the second plane.

2. The light module as defined in claim 1, wherein the light from the light source is transformed into a parallel light when it emits through the parallelizing surface and the first plane, and then is transformed into a linear light when it emits through the wave surface and the second plane.

3. The light module as defined in claim 1, wherein the wave surface has flat portions at crests and troughs.

4. The light module as defined in claim 1, wherein the parallelizing surface has a convex surface.

5. The light module as defined in claim 1, wherein the optical lens is made of plastic.

6. An optical lens, which is a single unit, comprising a parallelizing surface, a first plane, a wave surface, and a second plane in sequence, wherein the light enters the optical lens via the parallelizing surface and leaves the optical lens via the first plane, and then the light enters optical lens again via the wave surface and leaves the optical lens via the second plane and where the optical lens has a cavity at a center to form the first plane and the wave surface at opposite sidewalls of the cavity.

7. The optical lens as defined in claim 6, wherein the light is transformed into a parallel light when it emits through the parallelizing surface and the first plane, and then is transformed into a linear light when it emits through the wave surface and the second plane.

8. The optical lens as defined in claim 6, wherein the wave surface has flat portions at crests and troughs.

9. The optical lens as defined in claim 6, wherein the parallelizing surface has a convex surface.

* * * * *